(No Model.)

A. ANDERSON.
SLED BRAKE.

No. 391,874. Patented Oct. 30, 1888.

WITNESSES:
Phil. C. Dieterich
C. Sedgwick

INVENTOR:
A. Anderson
BY Munn & Co.
ATTORNEYS.

N. PETERS, Photo-Lithographer, Washington, D. C.

UNITED STATES PATENT OFFICE.

ANDERS ANDERSON, OF BLOSSBURG, MONTANA TERRITORY.

SLED-BRAKE.

SPECIFICATION forming part of Letters Patent No. 391,874, dated October 30, 1888.

Application filed June 21, 1888. Serial No. 277,708. (No model.)

*To all whom it may concern:*

Be it known that I, ANDERS ANDERSON, of Blossburg, in the county of Deer Lodge and Territory of Montana, have invented a new and Improved Sled-Brake, of which the following is a full, clear, and exact description.

This invention relates to sled-brakes, and has for its object to provide a sled-brake which will be effective in use and may be easily operated.

The invention consists in a sled-brake constructed and arranged as hereinafter described and claimed.

Reference is to be had to the accompanying drawings, forming a part of this specification, in which similar figures of reference indicate corresponding parts in all the views.

Figure 1:
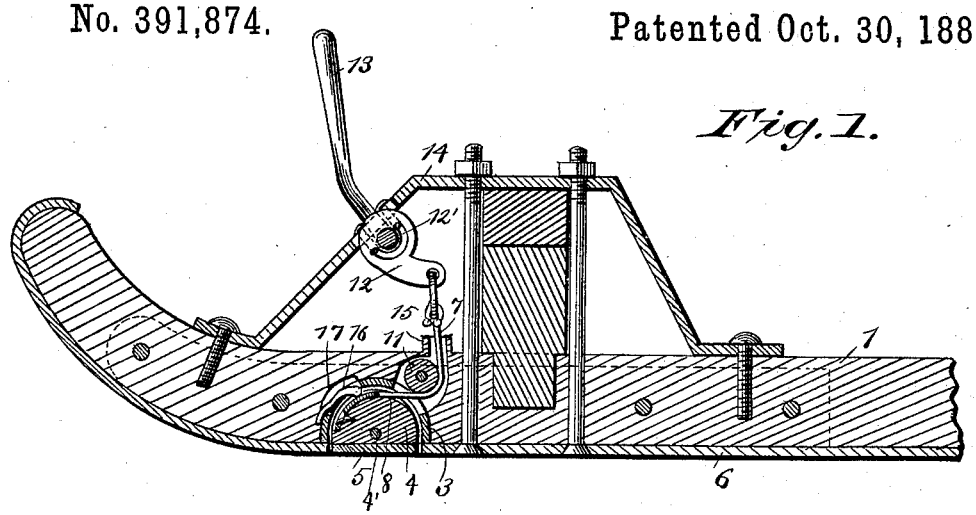
Figure 2:
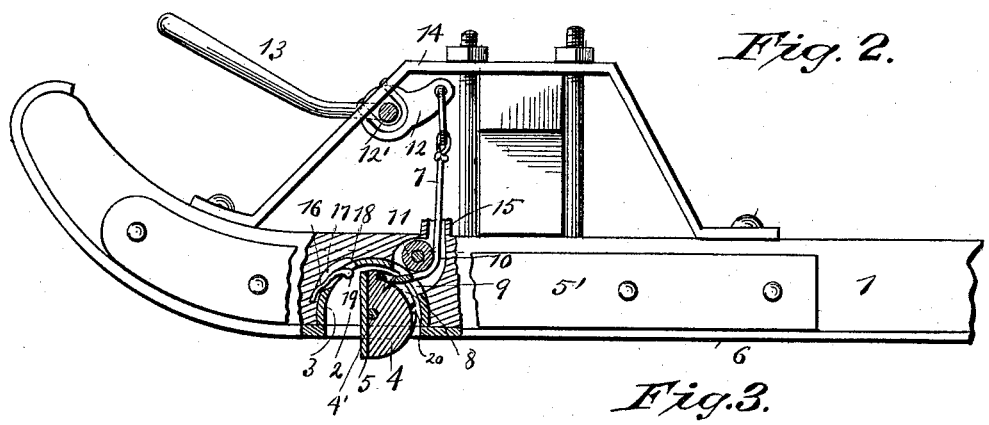
Figure 3:
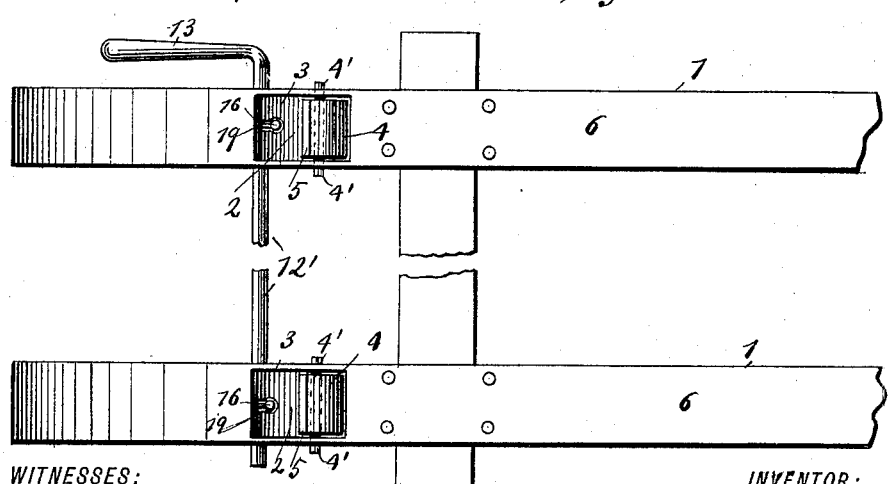
Figure 4:
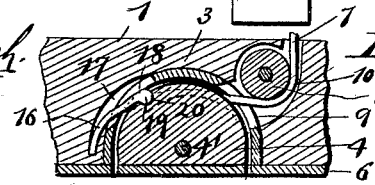

Figure 1 is a longitudinal section of the forward part of a sled-runner, showing a brake constructed in accordance with this invention. Fig. 2 is a side view of the forward part of a sled-runner with part broken away, showing the brake. Fig. 3 is a view of the under side of a pair of runners provided with brakes. Fig. 4 is a detail in vertical section showing the brake.

In carrying out this invention the forward part of the runners 1 of a sled is formed with a semicircular recess, 2, provided with a curved metallic lining, 3. Within the recess 2 is pivoted a brake, 4, corresponding in shape with the recess 2, and shod with a strip of metal, 5, which, when the brake is not in use, lies in the same plane as the shoe 6 of the runner. The ends of the pivot-pin 4' of the brake project through the sides of the runner and rest in metallic strips 5', thereby having a strong support. It will be seen that when the brake 4 is rotated backward it will be projected through the runner and form a stop for the same. The brake 4 is preferably operated by means of a cord, 7, or a strap or flat chain secured at one end to the forward part of the brake and extending through a groove, 8, in its upper portion, out at its rear through an opening, 9, in the lining 3, a passage-way, 10, in the runner, and over a roller, 11, therein, and connected at its other end to the arm 12 of a shaft, 12', having lever-handles 13, pivoted in the frame 14 of a sled. The upper end of the passage-way 10 is provided with a tube, 15, through which cord 7 passes, which tube prevents the snow and ice from getting into the passage-way 10. It will thus be seen by means of the foregoing-described construction that the brake 4 may be instantly rotated and projected through the runner to act as a stop by pulling or pushing on the lever-handle 13.

The brake by reason of its being rotary will yield to any obstructions in which it may be caught and may be easily turned up out of the way. It may also be used as a stop in going up hill, the cord 7 holding it in position. To keep the brake closed while the sled is being backed, a spring-catch, 16, is provided, located in a recess, 17, in the runner and projecting through an opening, 18, in the lining 3, adjacent to the forward part of the runner, and having a rounded head, 19, which engages a correspondingly-shaped recess, 20, in the brake. By this means when the sled is backed the brake will be held from any accidental turning, and when thrown in and out of the recess 2 by cord 7 and lever-handles 13 will readily engage with and disengage itself from the spring-catch 16.

The brake may be used with any kind of sled or sleigh, and will automatically be closed when meeting an obstruction upon slacking the cord 7.

While I have described a specific construction of parts, I do not intend to limit myself thereto, as the parts may be varied without departing from the essential features of the invention.

Having thus described my invention, what I claim as new, and desire to secure by Letters Patent, is—

1. A sled-brake consisting of a rotary block pivoted to the runner and having a straight side flush with the bottom of the runner and means for moving the brake into position for use, substantially as shown and described.

2. A sled-brake consisting of a rotary block pivoted to the runner and having a straight side flush with the bottom of the runner, an automatic catch for holding the brake in closed position, and means for moving the brake into position for use, substantially as shown and described.

3. A sled-brake consisting of a rotary block pivoted in a recess in the runner with a straight side flush with the bottom of the runner, a spring-arm in the runner with rounded head engaging a corresponding recess in the brake, and an operating-lever and flexible connection between lever and brake, substantially as shown and described.

4. A sled-brake consisting of rotary block 4 with recess 20 and metallic shoe 5, pivoted in recess 2, with curved metallic lining 3 and spring-catch 16, projecting into recess 2 and having rounded head 19, engaging recess 20, crank-shaft 12', with lever-handle 13 and arm 12, roller 11 in passage-way 10 in runner 1, and cord 7, passing over roller 11 and connected to brake 4, substantially as shown and described.

ANDERS ANDERSON.

Witnesses:
FREDERICK C. STEPPSHAWF,
LEMUEL J. SCOVIL.